(No Model.) 5 Sheets—Sheet 1.
A. BRYSON, Jr. & J. H. PENDLETON.
CONDUIT FOR CABLE RAILWAYS.

No. 430,109. Patented June 17, 1890.

Witnesses.
Chas. H. Smith
J. Staib

Inventors.
Andrew Bryson Jr
John H. Pendleton
per Lemuel W. Serrell atty (No Model.) 5 Sheets—Sheet 2.

A. BRYSON, Jr. & J. H. PENDLETON.
CONDUIT FOR CABLE RAILWAYS.

No. 430,109. Patented June 17, 1890.

Witnesses.
Chas H. Smith
J. Stait

Inventors.
Andrew Bryson Jr
John H. Pendleton.
per Lemuel W. Serrell attys (No Model.) 5 Sheets—Sheet 3.
A. BRYSON, Jr. & J. H. PENDLETON.
CONDUIT FOR CABLE RAILWAYS.
No. 430,109. Patented June 17, 1890.
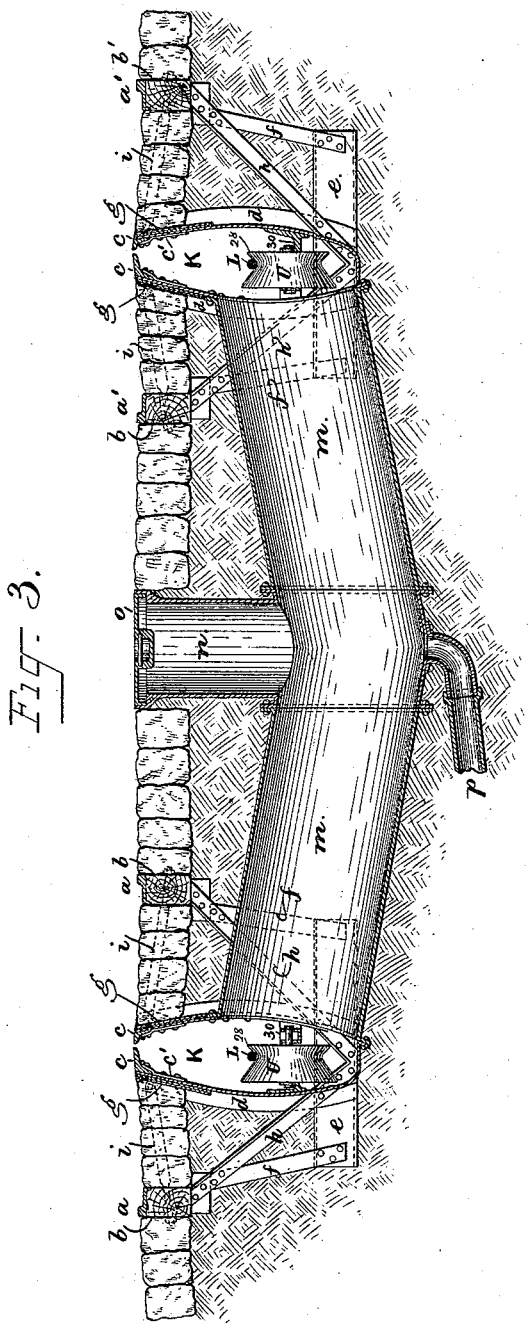
Witnesses.
Chas H. Smith
J. Staib
Inventors
Andrew Bryson Jr.
John H. Pendleton
per Lemuel W. Serrell Atty (No Model.) 5 Sheets—Sheet 4.
A. BRYSON, Jr. & J. H. PENDLETON.
CONDUIT FOR CABLE RAILWAYS.
No. 430,109. Patented June 17, 1890.
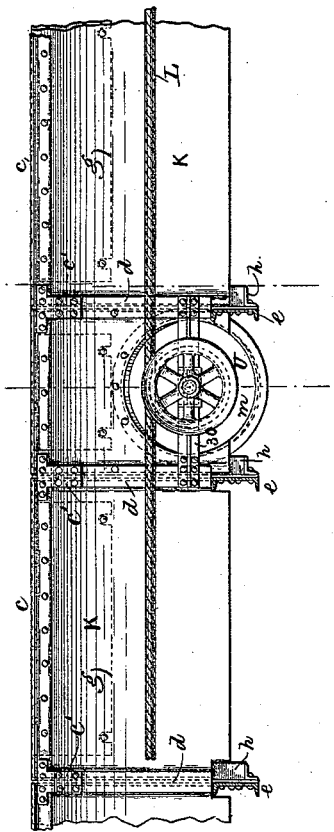
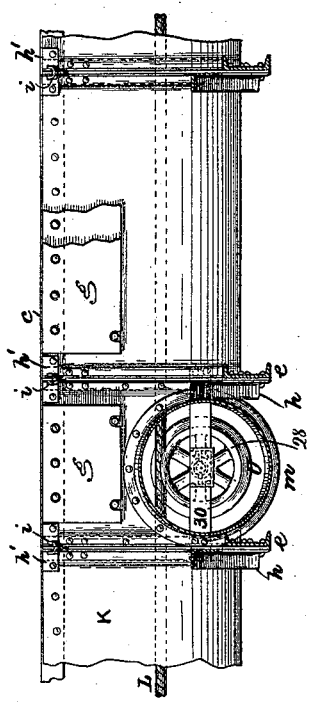
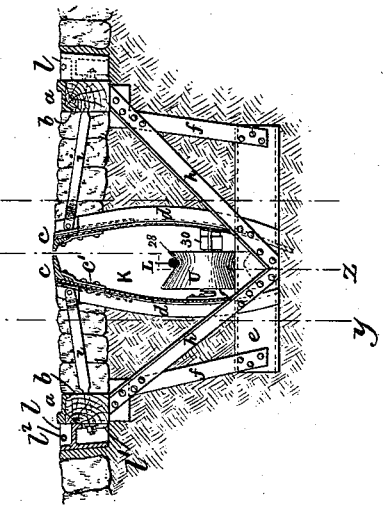
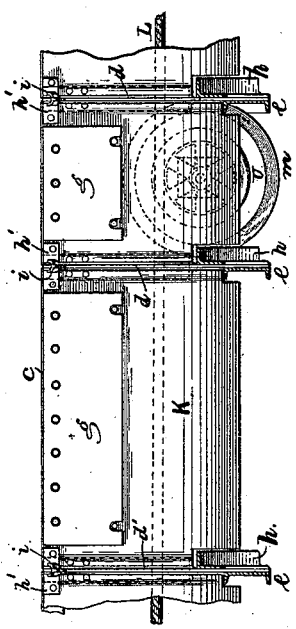
Witnesses.
Chas H. Smith
J. Stait
Inventors.
Andrew Bryson Jr
John H. Pendleton
per Lemuel W. Serrell atty (No Model.) 5 Sheets—Sheet 5.
A. BRYSON, Jr. & J. H. PENDLETON.
CONDUIT FOR CABLE RAILWAYS.
No. 430,109. Patented June 17, 1890.
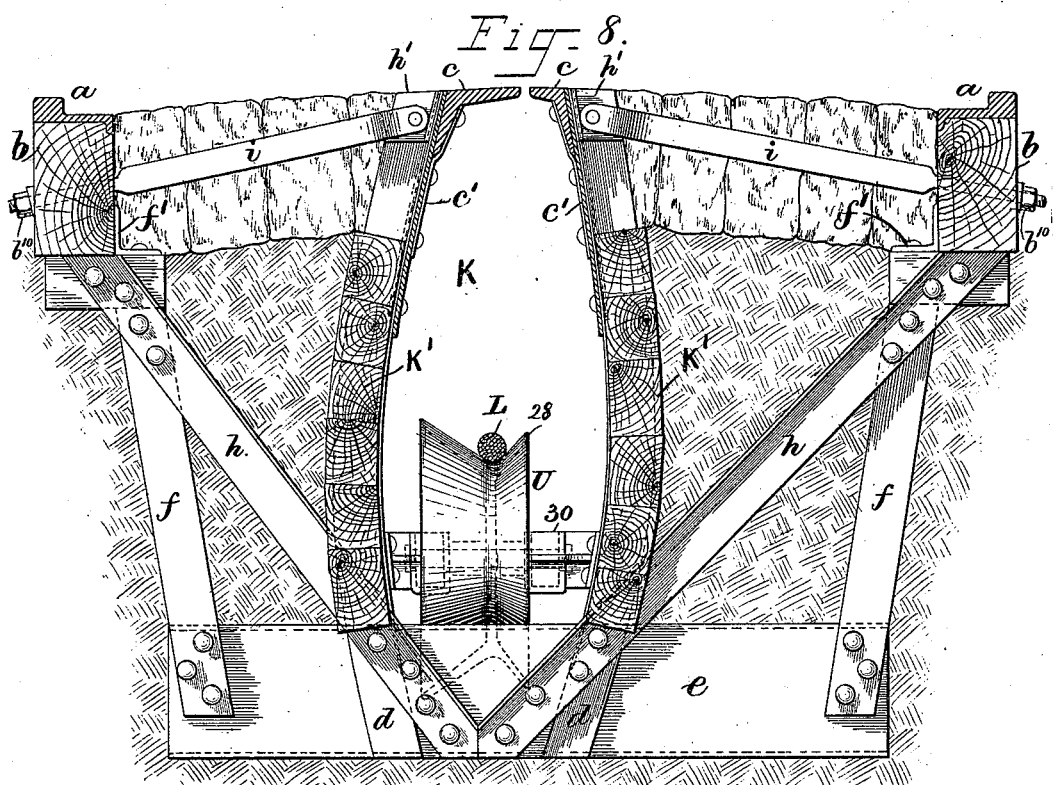
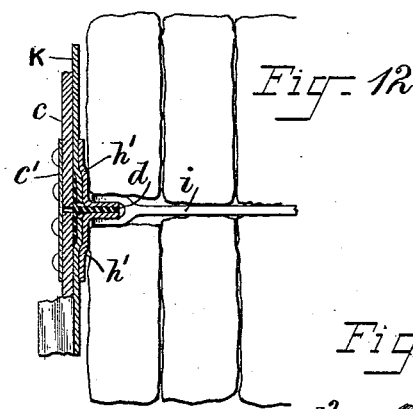
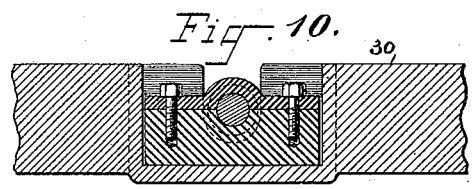
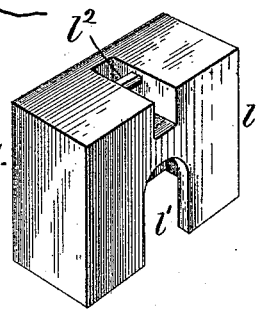
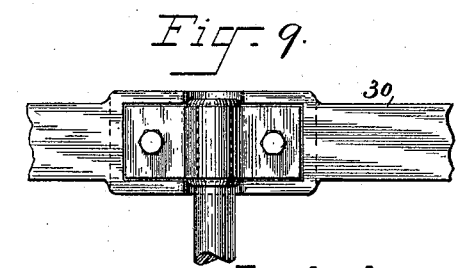
Witnesses.
Chas. H. Smith
J. Hail
Inventors.
Andrew Bryson Jr
John H. Pendleton
per Lemuel W. Serrell atty

UNITED STATES PATENT OFFICE.

ANDREW BRYSON, JR., OF NEW YORK, AND JOHN H. PENDLETON, OF BROOKLYN, NEW YORK, ASSIGNORS TO THE RAPID TRANSIT CABLE COMPANY, OF NEW YORK.

CONDUIT FOR CABLE RAILWAYS.

SPECIFICATION forming part of Letters Patent No. 430,109, dated June 17, 1890.

Application filed April 11, 1889. Serial No. 306,842. (No model.)

*To all whom it may concern:*

Be it known that we, ANDREW BRYSON, Jr., of the city and State of New York, and JOHN H. PENDLETON, of Brooklyn, in the county of Kings and State of New York, have invented an Improvement in Conduits for Cable Railways, of which the following is a specification.

This invention relates to the trench or conduit for cable railways; and the improvements are made in the structure itself for the purpose of adjusting the opening at the level of the street through which the connection to the grip passes from the car, and also to the device made use of for giving access to the trench or conduit for repairing or oiling the pulleys upon which the cable rests and for conveying away from the trench any water that may pass into the same.

Figure 1:
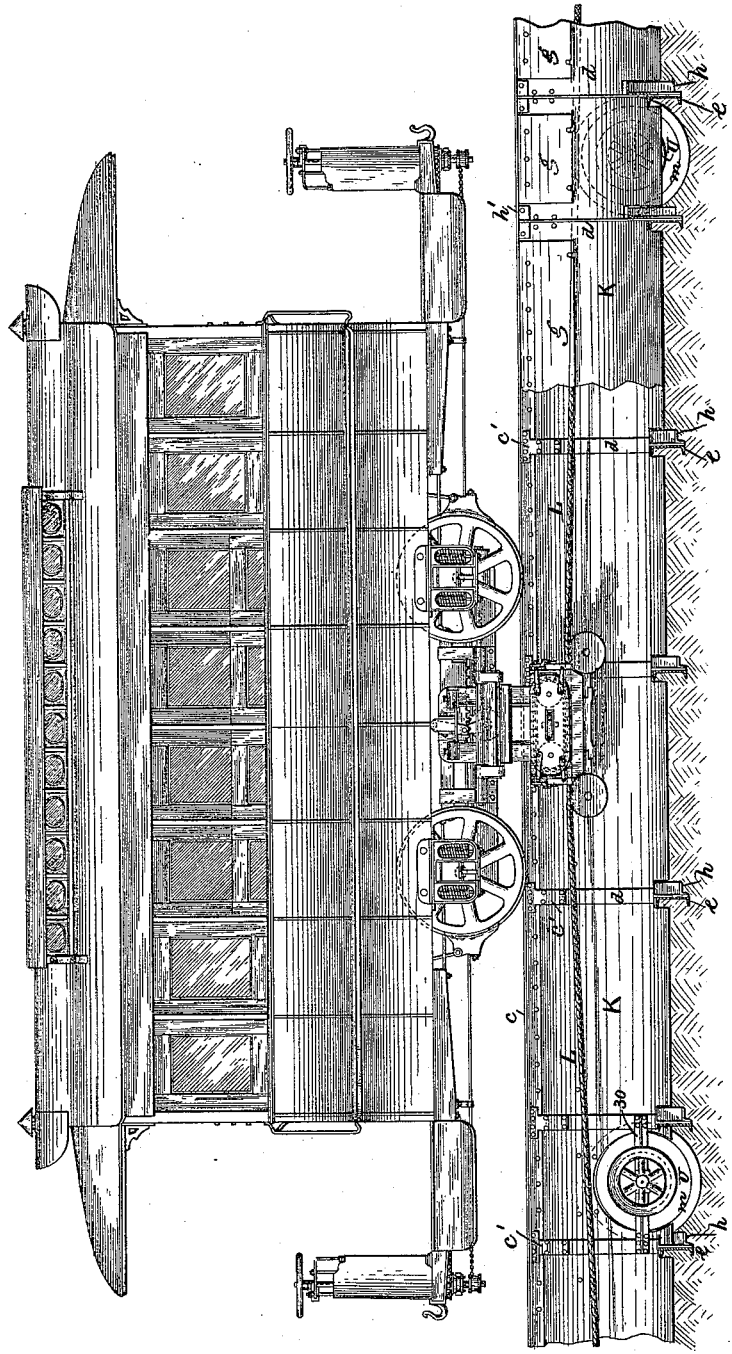
Figure 2:
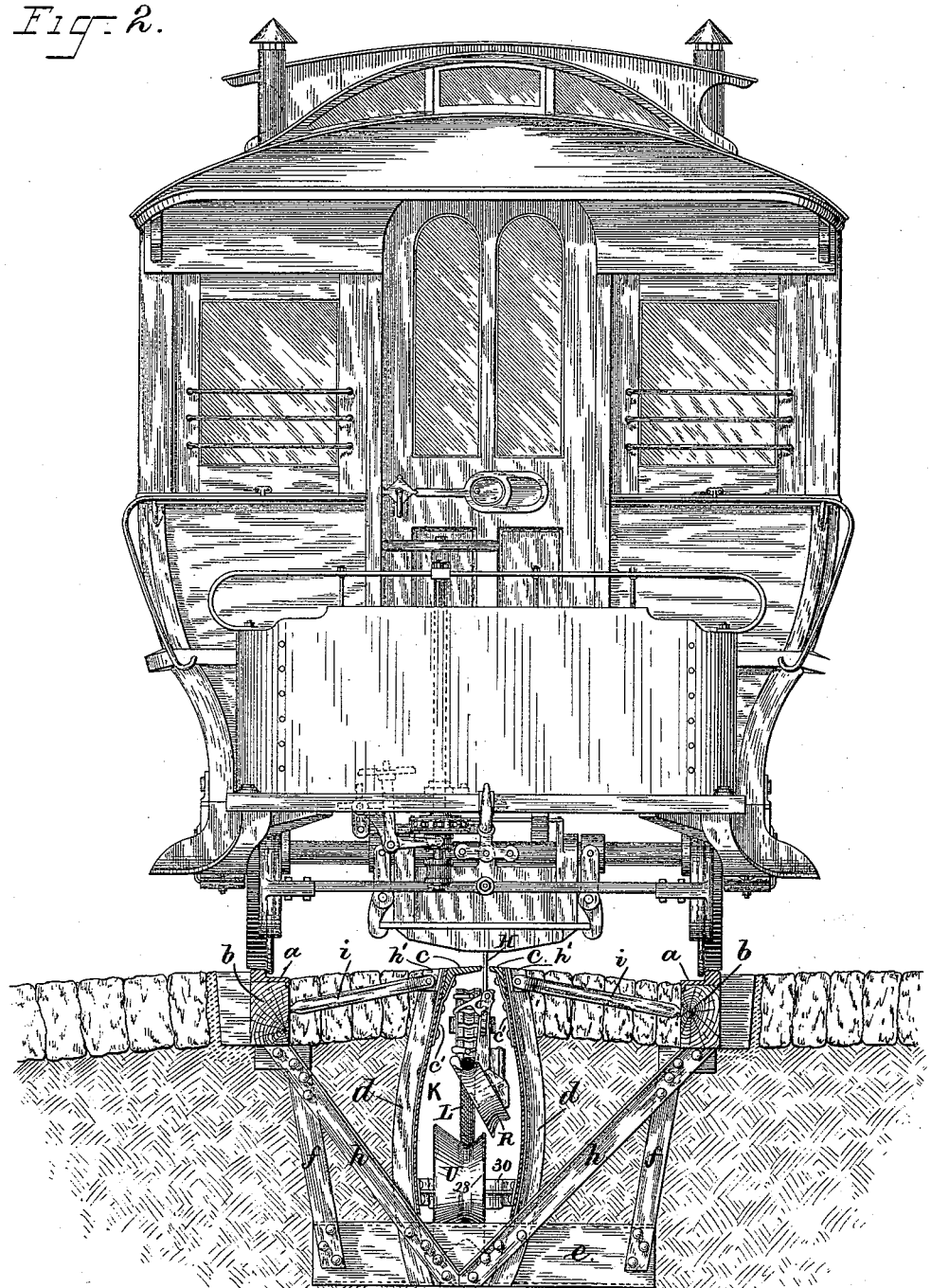

In the drawings, Figure 1 is a horizontal section of the trench. Fig. 2 is a cross-section in larger size, in both instances the car being represented and sufficient of the gripping mechanism to show the relation of the same to the trench or conduit. Fig. 3 is a cross-section representing the connection between the two conduits of the tracks. Fig. 4 is a cross-section of one conduit. Fig. 5 is a longitudinal section of a portion of such conduit. Fig. 6 is an elevation of the conduit with the bearers and braces in section at the line $y$ $y$, Fig. 4; and Fig. 7 is a similar view at the line $z$ $z$, Fig. 4. Fig. 8 is a cross-section in larger size of the conduit with a protection of wood outside the same. Fig. 9 is a plan, and Fig. 10 a section, of the bearer for the axle of the pulley. Fig. 11 is a perspective view of the movable boxes covering the adjusting-nut; and Fig. 12 is a plan view, partially in section, showing the connection to the tension-bars.

In Figs. 1 and 2 we have represented a portion of the car and the gripping mechanism corresponding to that represented in the application, Serial No. 292,260, filed November 30, 1888, of Pendleton, Bryson, and Tiers, and it is not necessary in this application to describe the parts of the car and the gripping mechanism; but the position of the parts in relation to the conduit or trench will be apparent upon inspection of Figs. 1 and 2.

The railway-tracks $a$ $a'$ are of any desired sectional shape, preferably those represented as adapted to lie flush, or nearly so, with the pavement of the street, and these railway-tracks rest upon and are attached to the wooden or iron sleepers $b$.

The trunk or conduit K is buried in the ground and midway, or nearly so, between the two rails of the track, and the general shape of this conduit is elliptical and made of plate or boiler iron within and supported by the angle-irons or ribs $d$, which are usually T-shaped in section, as represented in Fig. 12; and it is preferable to bend the sheet metal of the trunk or conduit K so that the inner face thereof is in line, or nearly so, with the face of the T-head upon the angle-irons $d$, as seen in Fig. 12. The upper end of the conduit or trunk K is partially closed by the L-shaped rails $c$, extending inwardly toward each other, and leaving a longitudinal slot, through which the hanging standard H passes down to the gripping mechanism made use of for seizing the cable L. These inward flanges $c$ are riveted to the interior of the trunk or conduit plates, and are preferably supported by plates $c'$, extending down below the nearly-vertical portions of the flanged rails $c$ and riveted to the conduit and to the rails $c$, as seen in Figs. 2, 3, 4, and 8.

The angle-iron ribs $d$ are connected to the horizontal cross-bearer $e$, that passes across the lower portion of the trunk, and it is to be understood that these angle-iron ribs $d$, cross-bearers $e$, and parts connected with them are made use of at suitable distances along the trunk, as represented in Figs. 1, 6, and 7, so as to properly support the sheet metal with which the conduit is lined and to obtain the necessary strength in the structure. At the outer ends of the horizontal cross-bearers $e$ there are columns $f$ for the sleepers $b$ to rest upon. Usually there will be horizontal shoes at the top ends of these columns projecting out beneath the sleepers for such sleepers to rest upon and to be connected by angle-irons $f'$, as seen in Fig. 8, and the diagonal braces $h$ extend from the upper portions of the columns $f$ down to the horizontal cross-bearer $e$, the parts being securely riveted together, so as to form a very stiff structure; and in order to prevent the direct contact of the paving blocks or stones and earth with the metallic plates forming the trunk or conduit we employ hanging removable fender plates or guards $g$. (Represented in Figs. 3, 6, and 7.) These are hung on studs along their upper edges to the outside of the conduit, and there are also studs near the lower edges of these hanging guards to retain them in position, as seen in Figs. 6 and 7. The object of these guards is to prevent frost acting directly against the sides of the trunk, as the guard-plates $g$ intervene between the frozen ground and the trunk, and should the expansion of the earth, due to the frost, press the sides of the trunk toward each other and render the slot at the top too narrow the nuts $b^{10}$ can be slackened sufficiently to allow the slot to close, or nearly so, and one or more of these hanging fenders or guard-plates can be pried off the studs upon which they are hung and lifted out, so that the slot in the top of the trunk can be opened to the proper width upon again tightening up the nuts $b^{10}$.

Adjacent to the upper end of each of the angle-iron ribs $d$ are stiffening angle-plates $h'$, and the tension-bars $i$, having forks at their inner ends, are riveted to the web of the external angle-iron rib and to the stiffening-plates, and these tension-bars pass through the sleepers $b$ and are provided with nuts $b^{10}$ at their outer ends, the object of this construction being to prevent the longitudinal slot between the inward flanges $c$ closing together by the action of the wheels of passing vehicles or by the action of frost, and should the longitudinal slot for the hanging standard H be too narrow at any part along the trunk or conduit it may be opened by a wrench applied to the nut upon the proper tension-bar $i$. The nuts $b^{10}$ of these tension-bars coming outside the sleepers $b$ are protected by movable nut-boxes $l$, (represented in the perspective view, Fig. 11,) such nut-boxes being preferably of cast-iron, notched at $l'$ to set over the base of the nut, and having a recess and lifter $l^2$ in the top, by which the nut-boxes can be pried up by a crow-bar or lever to give access easily to the nut $b^{10}$ that may be required to be tightened or slackened. These nut-boxes can be driven down again to the level of the pavement, as seen in Fig. 4, after the nuts have been acted upon.

In cases where braces have been used from the sides of the trunk to the horizontal cross-bearer below the trunk the same stiffen the structure in such a manner that the sides cannot be sprung to adjust the width of slot, and the bolts extending to the sleepers simply hold such sleepers in the proper position in relation to the conduit. In our improvements we do not have any diagonal braces between the cross-bearer and the sides of the trunk in order that the slot may be opened more or less by the nuts and tension-bars $i$.

The bottom of the trunk or conduit K may be open between one horizontal cross-bearer and the next, so that any water passing through the longitudinal slot at the top of the trunk may have opportunity to soak away; but we prefer to fill this space with cement or concrete to form a trough-shaped gutter for water to run to the sewer-connection.

The supporting-wheels U are to be placed at suitable distances apart for the cable L, and these wheels U are made with flanges 28 around the smaller portion of the conical surfaces, so that the cable runs in the groove between the conical portion and the flange, and this allows the supporting or pick-up wheels R to travel along with the grip and car without coming in contact with the supporting-wheels U, as indicated in Fig. 2, the cable being raised sufficiently above such supporting-wheels by the grip and the wheels R, as indicated in Fig. 1.

The supporting-wheels U are within the frame 30, that is secured upon the lower part of the trunk or conduit K and between two sets of frames formed by the angle-iron ribs $d$ and horizontal cross-bearers $e$, and the bearings within the frames 30 for the shafts of the supporting-wheels U are represented in Figs. 9 and 10, such bearings being composed of two parts bolted together, as usual in journal-boxes. These bearings, however, are received into box-shaped sockets in the frames 30, so that they will remain in place by gravity when in use, but may be lifted out with the pulley and its shaft whenever the bearings or the pulley are worn or injured. This is a great convenience, as it is only necessary to hold the cable up momentarily while the injured pulley and journal box or bearing are taken out and others slipped into place. These frames and bearings being at the cross-conduit allow the pulley to be removed and another put in place with but a moment's delay.

Under ordinary circumstances the supporting-wheels of the cable made use of in trunks or conduits are difficult of access for oiling or repairs. We make use of a transverse trunk $m$, extending from one conduit K to the other, and preferably at a downward inclination to the middle, so that any water passing into the trunks or conduits K will run into the transverse trunks $m$, and from the middle thereof pass by the pipe $p$ to a sewer or drain, and we give access to the transverse trunk $m$ by the entrance-tube $n$, which is provided with a movable cover $o$ at the level of the surface of the pavement, so that by the removal of this cover $o$ a man may pass down into the transverse trunk $m$ and pass in either direction to the supporting-pulley U for oiling or repairing the same, and it is advantageous to provide these transverse trunks and man-holes in line with each supporting-wheel, the two supporting-wheels in the trunks or conduits being opposite to each other, so as to be accessible through one entrance-tube and transverse trunk.

If desired, there may be wooden planking (shown at K', Fig. 8) outside the metal plates of the trunk or conduit K, or such wooden planking may take the place of the metal plates, the structure otherwise remaining unchanged.

We claim as our invention—

1. The combination, with the cable-railway trunk or conduit having a lining of sheet metal and external angle-iron ribs $d$, of the horizontal cross-bearers $e$, connected to the sides of the ribs $d$, the sleepers $b$ for the track-bars, the columns $f$ and braces $h$ for supporting the sleepers, and the screw tension-bars $i$, connected at their inner ends to the external angle-iron ribs and passing through the sleepers, and provided with nuts by which the upper part of the conduit is braced and the width of slot adjusted, substantially as set forth.

2. The combination, with the external angle-iron ribs upon the trunk or conduit, of the stiffening angle-plates $h'$ and the tension-bars $i$, passing through the track-sleepers and provided with nuts, substantially as and for the purposes set forth.

3. The combination, with the trunk or conduit for cable railways, of the tension-bars $i$, connected at their inner ends to the upper portions of the trunk or conduit, the track-sleepers through which the tension-bars pass, nuts upon such tension-bars, and movable nut-boxes covering the nuts and forming part of the pavement adjacent to the sleepers, substantially as set forth.

4. The combination, with the cable-railway trunk or conduit and the supporting-wheels for the cable within such conduit, of the transverse trunk opening into the side of the main trunk or conduit adjacent to the supporting-wheels and an entrance-tube and movable cover to such transverse trunk, whereby access is obtained to the supporting-wheels and their bearings for repair or removal, substantially as set forth.

5. The combination, with the conduit for the cable and the transverse trunk opening into the same and the supporting-pulley and its shaft, of the frames 30 across the end of the transverse conduit, and having recesses or boxes therein, and the journal boxes or bearings on the axis of the pulley and setting into the recesses or boxes and removable therefrom, substantially as specified.

6. The combination, with the main trunk or conduit for a cable railway, of the hanging fender plates or guards upon the outside portions of such trunk and the rods and nuts for varying the width of the slot between the upper edges of the conduit, substantially as set forth.

7. The combination, with the supporting-pulley and its shaft, of the frames 30, having recesses or boxes therein and the journal boxes or bearings on the axis of the pulley and setting into the recesses or boxes and removable therefrom, substantially as specified.

Signed by us this 8th day of April, 1889.

ANDREW BRYSON, JR.
J. H. PENDLETON.

Witnesses:
GEO. T. PINCKNEY,
WILLIAM G. MOTT.